United States Patent

Steffens, Jr. et al.

[11] Patent Number: 5,542,696
[45] Date of Patent: Aug. 6, 1996

[54] SEAT MOUNTED AIR BAG MODULE

[75] Inventors: Charles E. Steffens, Jr., Washington; Louis R. Brown, Oxford, both of Mich.

[73] Assignee: TRW Vehicle Safety Systems Inc., Lyndhurst, Ohio

[21] Appl. No.: 506,314

[22] Filed: Jul. 24, 1995

[51] Int. Cl.$^6$ .................................. B60R 21/22
[52] U.S. Cl. ...................... 280/730.2; 280/730.1
[58] Field of Search .................... 280/730.2, 730.1, 280/728.1, 728.2

[56] References Cited

U.S. PATENT DOCUMENTS

| | | | |
|---|---|---|---|
| 3,779,577 | 12/1973 | Wilfert | 280/730.1 |
| 4,946,191 | 8/1990 | Putsch | 280/730.2 |
| 5,112,079 | 5/1992 | Haland et al. | 280/730.1 |
| 5,308,112 | 5/1994 | Hill et al. | 280/730.2 |
| 5,348,342 | 9/1994 | Haland et al. | 280/730.2 |
| 5,431,435 | 7/1995 | Wilson | 280/728.1 X |

FOREIGN PATENT DOCUMENTS 4218252  12/1992  Germany ................ 280/730.1

OTHER PUBLICATIONS

Research Disclosure No. 37314 May 1995.

*Primary Examiner*—Christopher P. Ellis
*Attorney, Agent, or Firm*—Tarolli, Sundheim, Covell, Tummino & Szabo

[57] ABSTRACT

An air bag module (10) is mounted in a vehicle seat (12). The module (10) includes an inflator (14) and a folded air bag (12) which is spaced apart from the inflator. An expandable throat (150) defines an inflation fluid passage (151) extending between the inflator (14) and the air bag (12). The throat (150) expands, upon actuation of the inflator (14), to increase the effective cross-sectional flow area of the inflation fluid passage by at least 20% and, preferably, by 50% to 100% or more. At least one wall (154) of the throat (100) moves under pressure from inflation fluid from the inflator (14) to expand the throat.

17 Claims, 5 Drawing Sheets

SEAT MOUNTED AIR BAG MODULE

BACKGROUND OF THE INVENTION

1. Technical Field

The present invention relates to a vehicle safety apparatus and, in particular, relates to an air bag module which is mounted in a vehicle seat to help protect a vehicle occupant in the event of a side impact to the vehicle.

2. Description of the Prior Art

It is known to inflate an air bag to help protect a vehicle occupant in the event of a side impact to a vehicle. The air bag is stored in a deflated condition, together with an inflator, in a vehicle seat in which the occupant sits. In the event of a side impact to the vehicle of a magnitude sufficient to require protection of the vehicle occupant, the inflator is actuated and the air bag is inflated into a position between the vehicle occupant and the adjacent side structure of the vehicle. The air bag can help protect the vehicle occupant from forcefully striking or being struck by parts of the vehicle side structure, such as the vehicle door. The air bag can also help protect the vehicle occupant from objects, such as a tree or a pole, which might intrude through the side structure of the vehicle during the side impact.

A vehicle seat in which an air bag module is mounted commonly includes a layer of foam padding over the air bag module, an external fabric material covering the foam padding, and one or more seat frame members which structurally support the air bag module and the other parts of the seat. The air bag module is mounted in the seat so that the deflated air bag is located near the outside of the seat, and can easily inflate into a position outside of the seat to help protect the vehicle occupant. The thickness of the vehicle seat is preferably kept to a minimum to increase usable interior space in the vehicle. The presence of the seat frame, and other constraints such as the thickness of the seat, can make it difficult to mount an inflator and an air bag in a desirable position within the vehicle seat.

SUMMARY OF THE INVENTION

The present invention is a vehicle occupant safety apparatus comprising a seat in which the vehicle occupant sits and an inflatable vehicle occupant restraint mounted in the seat. The inflatable restraint has a deflated condition stored in the seat and has an inflated, occupant protecting condition extending out of the seat. An inflator is mounted in the seat at a location spaced apart from the inflatable restraint. The inflator is actuatable to direct inflation fluid under pressure into the inflatable restraint to inflate the inflatable restraint. The air bag module further includes wall means for defining in the seat an inflation fluid passage for directing inflation fluid from the inflator to the inflatable restraint upon actuation of the inflator. The wall means has a first condition when the inflator is not actuated in which the inflation fluid passage has a first cross-sectional flow area. The wall means is movable, upon actuation of the inflator, from the first condition to a second condition in which the inflation fluid passage has a second cross-sectional flow area which is greater than the first cross-sectional flow area. In a preferred embodiment, the cross-sectional flow area of the inflation fluid passage increases by at least about 20% and, preferably, by about 50% to about 100% or more.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
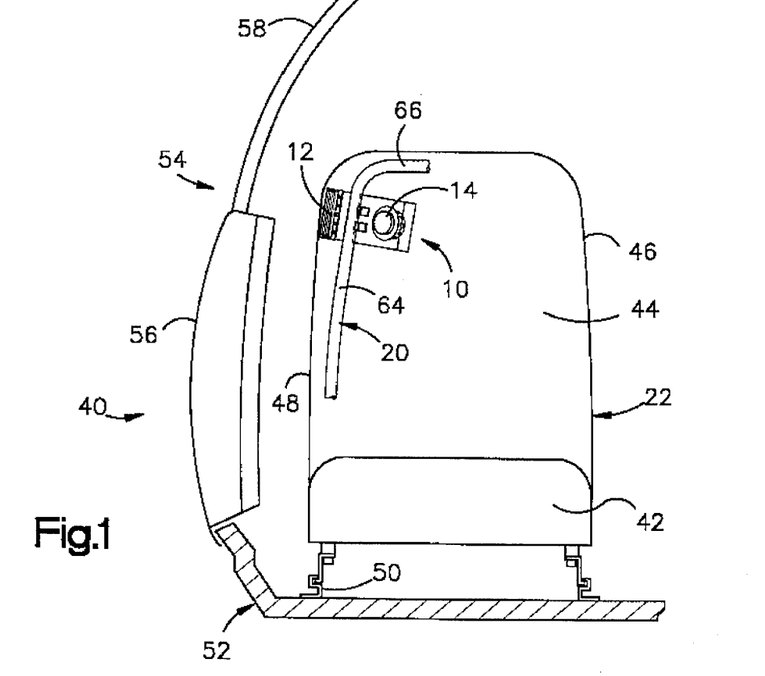
FIG. 1 is a front view of a vehicle seat including a side impact air bag module in accordance with the present invention.

The present invention relates to a vehicle safety apparatus and, in particular, relates to an apparatus for helping to protect an occupant of a vehicle in the event of a side impact to the vehicle which is of a magnitude sufficient to require deployment of an inflatable vehicle occupant restraint. The present invention is applicable to various vehicle occupant safety apparatus constructions. As representative of the present invention, FIG. 1 illustrates a specific vehicle occupant safety apparatus, i.e., air bag module 10.

The air bag module 10, described below in detail, includes a specific type of inflatable vehicle occupant restraint which is commonly described as an "air bag" 12 and an inflator 14 for inflating the air bag. A pair of mounting brackets 16 (FIG. 2) secure the air bag module 10 to a seat frame member 20 of a vehicle seat 22.

The vehicle seat 22 (FIG. 1) is illustrated as a front passenger seat of a vehicle 40 and includes a seat bottom portion 42 and a seat back 44. The seat back 44 has an inboard side 46 and an outboard side 48. The seat 22 may also include a headrest (not shown) which is supported on or is formed as a portion of the vehicle seat back 44.

The seat 22 is supported by tracks 50 on a body portion 52 of the vehicle 40. The vehicle body 52 also includes a side structure indicated generally at 54. In the illustrated configuration, the vehicle side structure 54 includes a door 56 and a window 58 which are disposed adjacent to the vehicle seat 22. It should be understood that the present invention is applicable to vehicles including other types of side structure, such as a van with no window or door disposed adjacent to the seat 22. This invention is also applicable to frontal air bag modules mounted in an instrument panel.

The seat frame member 20 is disposed in the seat back 44 of the vehicle seat 22. The seat frame member 20 has a tubular cross-section and is generally L-shaped in configuration. The L-shaped configuration of the seat frame member 20 is provided by a first leg 64 which extends generally vertically in the seat back 44 and a second leg 66 which extends generally horizontally in the seat back 44.

The air bag module 10 is disposed in the seat back 44 of the vehicle seat 22. The seat back 44 includes a body of foam padding material 60 (FIG. 3) and an external fabric material covering 62 which overlies the foam material. A movable cover illustrated schematically at 64 (FIG. 4), which includes a portion of the fabric material covering 62, conceals the air bag module 10 when the air bag module is in the unactuated condition shown in FIG. 3. The cover 64 is held in the closed position shown in FIG. 3 by a tear seam or tear stitches (not shown) or in any other suitable manner. The cover 64 is pivotable downward, upward, or rearward to an open position shown schematically in FIG. 4 in a manner described below upon actuation of the inflator 14.

The air bag module 10 includes an inflator housing 70 (FIGS. 2–4) which is supported on the seat frame member 20 by the mounting brackets 16. The housing 70 is a rigid box-like structure and is preferably made of sheet metal. The housing 70 includes a plurality of side walls 72, 74 and 76, and top and bottom walls not shown, which define a chamber 80 in the housing. The side walls 72 and 76 of the housing 70, together with the top and bottom walls of the housing, define an outlet opening 82 in the housing.

The inflator 14 (FIG. 3) is mounted in the housing 70. The inflator 14 comprises a source of inflation fluid for inflating the air bag 12. As known in the art, the inflator 14 may contain an ignitable gas generating material which, when ignited, rapidly generates a large volume of gas. The inflator 14 may alternatively contain a stored quantity of pressurized inflation fluid, or a combination of pressurized inflation fluid and ignitable material for heating the inflation fluid.

The inflator 14 has a cylindrical main body portion 90. A plurality of fluid outlet openings 92 (FIG. 3) are equally spaced in a circular array around a central axis 94 of the inflator 14. The fluid outlet openings 92 enable inflation fluid to flow from the inflator 14 into the chamber 80 in the housing 70.

An annular mounting flange 96 of the inflator 14 projects radially outward from the main body portion 90. The mounting flange 96 is fastened, in a manner not shown, to the side wall 76 of the housing 70 to secure the inflator 14 in position on the housing. A pair of lead wires 98 extend from the inflator 14 and are connected with known electric circuitry of the vehicle indicated schematically at 100. The electric circuitry 100 includes a collision sensor and a power source, such as the vehicle battery, for actuation of the inflator in a known manner in the event of a side impact to the vehicle of a magnitude sufficient to require deployment of the air bag 12.

The air bag module 10 includes a chute 110 which is a rigid box-like structure preferably made from metal. The chute 110 is supported in a manner not shown on the housing 70 or on the seat frame member 20, so that the chute is fixed in position relative to the housing. The chute 110 is spaced apart from the housing 70.

The chute 110 includes opposite side walls 112 and 114, and top and bottom walls (not shown), which define a chamber 120 in the chute. The side walls 112 and 114 and the top and bottom walls of the chute 110 define an inlet opening 122 in the chute. The inlet opening 122 is presented generally toward the seat frame member 20 and the housing 70. The inlet opening 122 in the chute 110 is spaced apart from the outlet opening 82 in the housing 70.

The side walls 112 and 114 and the top and bottom walls of the chute 110 also define an outlet opening 124 in the chute 110. The air bag module 10 is preferably secured to the seat frame member 20 such that the outlet opening 124 in the chute 110 faces forward and outward at an acute angle to a front-to-back axis 126 of the vehicle seat 22 and upward at an acute angle from the horizontal. These angles help to ensure deployment of the air bag 12 in a desired direction.

The air bag 12 (FIG. 3) includes a mouth portion 130 which is tubular in configuration and which is secured to the chute 110 in a known manner with a retaining ring 132 and fasteners 134. A body portion 136 of the air bag 12 is folded and stored inside the chute 110, in a known manner as shown schematically in FIG. 3. The chute 110 supports the folded body portion 136 of the air bag 12 in a position spaced apart from the housing 70 and from the inflator 14. The seat frame member 20 is disposed between the air bag 12 and the inflator 14.

The air bag module 10 includes a throat 150 (FIGS. 3 and 4) which defines an inflation fluid passage 151 for conducting inflation fluid from the housing 70 to the chute 110. The throat 150 is connected in fluid communication between the outlet opening 82 in the housing 70 and the inlet opening 122 in the chute 110. The throat 150 is fluid-tight so that it directs inflation fluid from the inflator 14 to flow through the inflation fluid passage 151 into the chute 110 and not into the seat back 44. The throat 150 is movable from a first or contracted or collapsed condition shown in FIG. 3 to a second or expanded condition shown in FIG. 4 during inflation of the air bag 12. The throat 150 can be of many different constructions. A few alternative constructions are illustrated schematically in FIGS. 9–13 and are discussed below.

Figure 3:
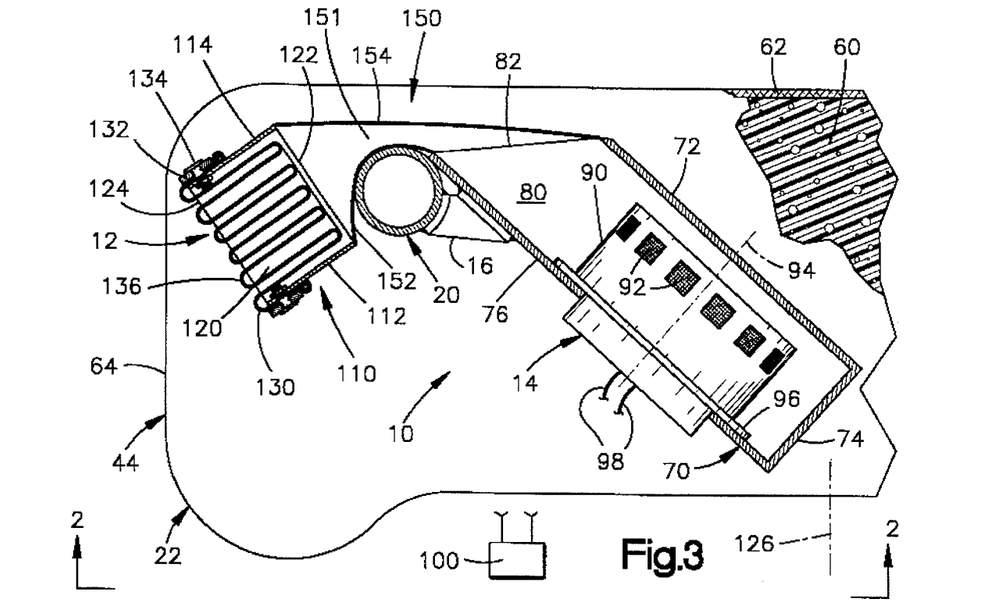
FIG. 3 is a top view partially in section of the air bag module of FIG. 1 in an unactuated condition.
Figure 4:
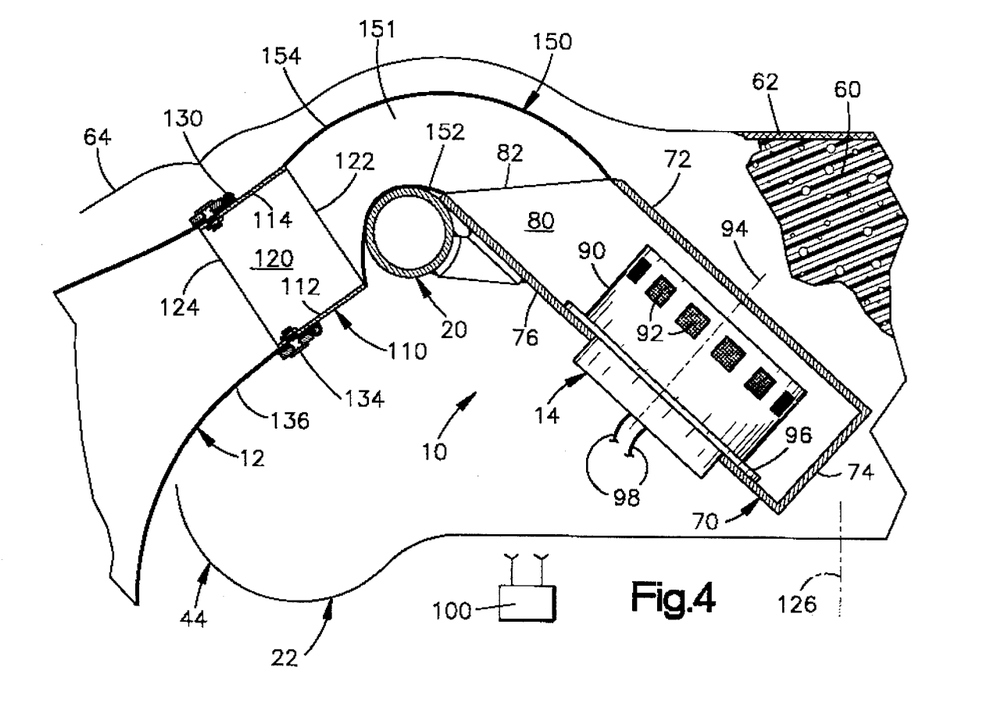
FIG. 4 is a view similar to FIG. 3 showing the air bag module in the actuated condition.

The throat 150 which is shown schematically in FIGS. 3 and 4 includes a first wall 152 which extends between and interconnects the side wall 76 of the housing 70 and the side wall 112 of the chute 110. The first wall 152 of the throat 150 is wrapped partially around the seat frame member 20. A second wall 154 of the throat 150 extends between and interconnects the side wall 72 of the housing 70 and the side wall 114 of the chute 110.

The throat 150 also includes a top wall (not shown) which extends between and interconnects the top wall of the housing 70 and the top wall of the chute 110. The throat 150 further includes a bottom wall (not shown) which extends between and interconnects the bottom wall of the housing 70 and the bottom wall of the chute 110. The second wall 154 of the throat 150, and the top and bottom walls of the throat, are adjacent to the foam material 60 of the seat back 44. The walls of the throat 150 are made from a flexible or expandable material such as woven fabric, corrugated metal, plastic, or a combination of these materials. The walls of the throat 150 may also be constructed in accordance with the embodiments of the invention shown in FIGS. 9–13.

At least some of the walls of the throat 150 are movable under the influence of inflation fluid from the inflator 14 upon actuation of the inflator. Specifically, the second wall 154 of the throat 150, and the top and bottom walls (not shown) of the throat, are movable between the condition shown in FIG. 3 and the condition shown in FIG. 4. The second wall 154 and the top and bottom walls of the throat 150 are movable relative to the first wall 152 of the throat and relative to the seat frame member 20. The second wall 154 is movable away from the seat frame member 20. The foam material 60 and the fabric material covering 62 which overlie the wall 154 are movable away from the seat frame member 20 when the wall 154 moves.

When the movable walls of the throat 150, including the second wall 154, are in the condition shown in FIG. 3, the inflation fluid passage 151 defined by the throat has a first or contracted effective cross-sectional flow area. The effective cross-sectional flow area of the throat 150, when the throat is in the condition shown in FIG. 3, is relatively small compared to the effective cross-sectional flow area of the throat when the throat is in the condition shown in FIG. 4.

The presence of the seat frame member 20 between the inflator 14 and the air bag 12 contributes to the relatively small effective cross-sectional flow area of the throat 150 when the throat is in the condition shown in FIG. 3. When the safety apparatus 10 is in the condition shown in FIG. 3, the effective cross-sectional flow area of the throat 150 adjacent to the seat frame member 20 is substantially less than the effective cross-sectional flow area of the throat at the outlet 82 of the housing 70. Also, the effective cross-sectional flow area of the throat 150 adjacent to the seat frame member 20 is substantially less than the effective cross-sectional flow area of the throat at the inlet 122 of the chute 110.

In the event of a side impact to the vehicle 40 of a magnitude sufficient to require deployment of the air bag 12, the vehicle electric circuitry 100 actuates the inflator 14 in a known manner. The inflator 14 rapidly discharges a large quantity of inflation fluid at high pressure through the fluid outlet openings 92 into the chamber 80 in the housing 70. The pressure in the housing 70 increases as a result of the actuation of the inflator 14, and the increased fluid pressure is transmitted through the outlet opening 82 in the housing into the throat 150.

When the fluid pressure in the throat 150 is greater than the forces holding the movable walls of the throat in the collapsed position shown in FIG. 3, that is, when the pressure in the throat reaches a first predetermined pressure, the force of the inflation fluid acting on the movable walls, including the wall 154, of the throat causes the throat to move to the second or expanded position shown in FIG. 4. The initial opening in the throat may vary in relation to the resistance of the throat material and/or the available inflator energy. The second wall 154 and the top and bottom walls of the throat 150 move relative to the first wall 152 of the throat and relative to the seat frame member 20. The second wall 154 moves away from the seat frame member 20. The foam material 60 and the fabric material covering 62 which overlie the movable throat walls, including the wall 154, are moved away from the seat frame member 20 by the moving walls of the throat 150.

When the throat 150 moves from the condition shown in FIG. 3 to the condition shown in FIG. 4, the effective cross-sectional flow area of the throat 150 increases to a relatively large second effective cross-sectional flow area which is greater than the first effective cross-sectional flow area. The effective cross-sectional flow area of the throat 150 increases by at least about 20% and, preferably, by about 50% to about 100% or more. The inflation fluid from the inflator 14 flows from the housing 70 through the inflation fluid passage 151 in the throat 150 and into the chute 110. The inflation fluid contacts the folded body portion 136 of the air bag 12 and causes the air bag to inflate.

The inflating body portion 136 of the air bag 12 engages the cover 64. The tear seam or tear stitches (not shown) holding the cover 64 in the closed position shown in FIG. 3 break, and the cover moves from the closed position to the open position shown in FIG. 4. The body portion 136 of the air bag 12 moves from the folded and stored condition illustrated in FIG. 3 to the unfolded and inflated condition illustrated schematically in FIG. 4 to help protect the vehicle occupant.

Figure 5:
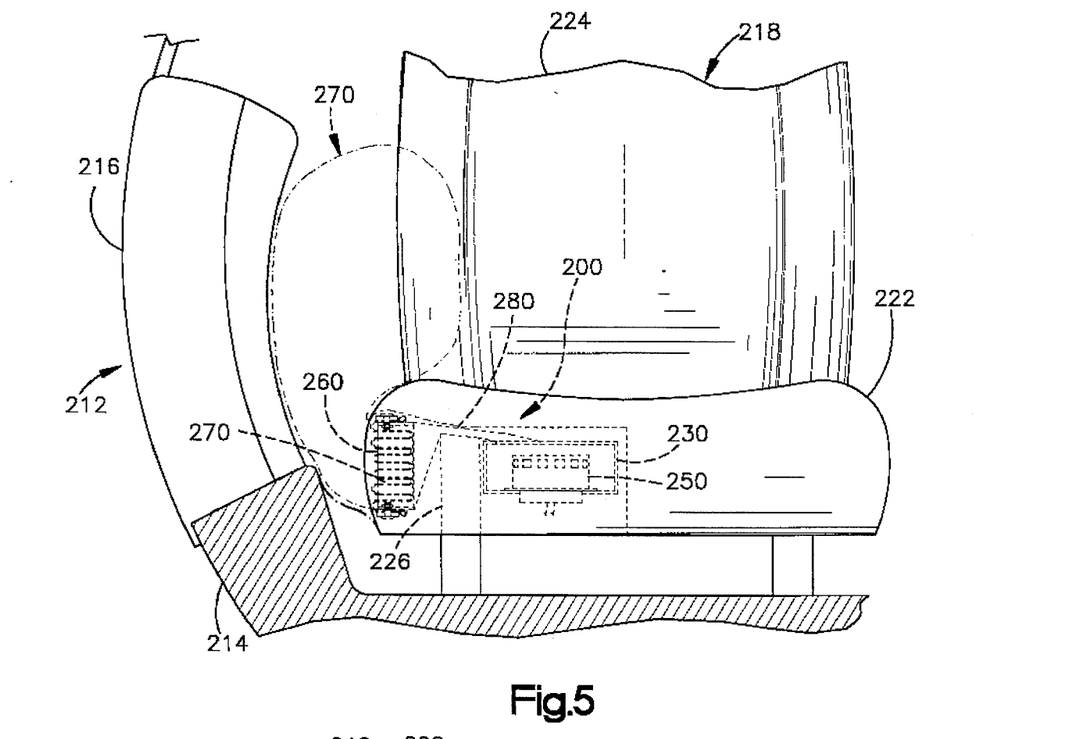
FIG. 5 is a front view of a vehicle seat including a side impact air bag module in accordance with a second embodiment of the present invention.
Figure 6:
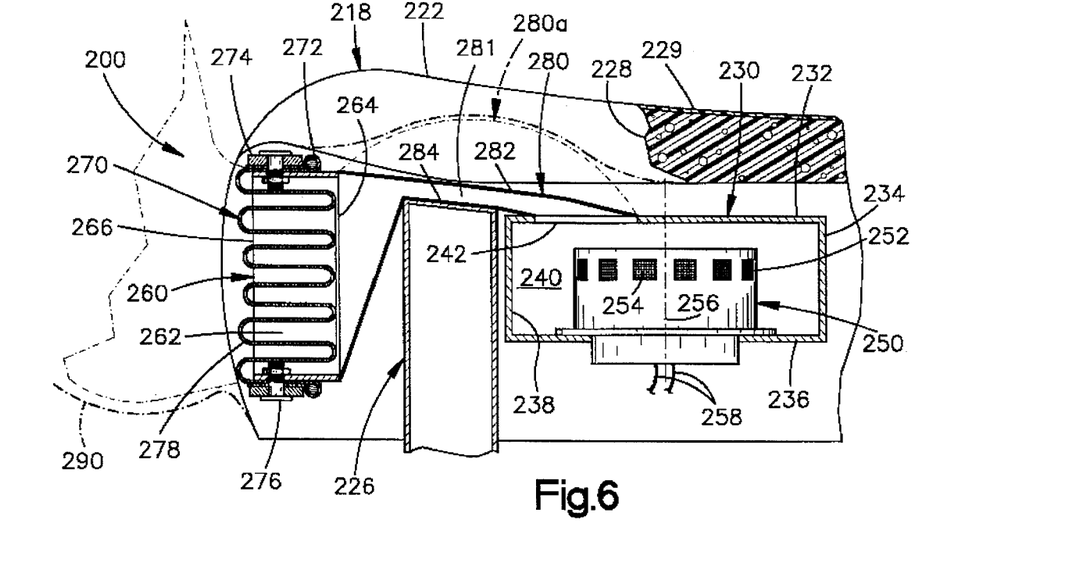
FIG. 6 is a top view partially in section of the air bag module of FIG. 5, shown in solid lines in an unactuated condition and in dot-dash lines in an actuated condition.

FIGS. 5 and 6 illustrate a vehicle safety apparatus, i.e, air bag module 200, which is constructed in accordance with a second embodiment of the present invention. The air bag module 200 is disposed in a vehicle 212 which has a body 214 including a door 216. Disposed adjacent to the door 216 is a seat 218 supported on the vehicle body 214. The seat 218 includes a seat bottom cushion 222 and a seat back 224. The seat bottom cushion 222 includes a seat frame member 226 which supports a layer of foam padding 228 and a fabric material covering 229 over the air bag module 200.

The air bag module 200 includes a housing 230 which is supported, in a manner not shown, on the seat bottom cushion 222. The housing 230 is similar to the housing 70 (FIGS. 2–4) and includes a top wall 232, a bottom wall 236, two side walls 234 and 238, and two other side walls (not shown). The walls of the housing 70 define a chamber 240 in the housing. An outlet opening 242 is formed in the top wall 232 of the housing 230.

An inflator 250 is mounted in the housing 230. The inflator 250 may be of the same construction as the inflator 14 (FIGS. 1–4). The inflator 250 has a cylindrical main body portion 252. A plurality of fluid outlet openings 254 (FIG. 3) are equally spaced in a circular array around a central axis 256 of the inflator 250. The fluid outlet openings 254 enable inflation fluid to flow from the inflator 250 into the chamber 240 in the housing 230. A pair of lead wires 258 extend from the inflator 250 and are connected with known electric circuitry of the vehicle (not shown) such as the circuitry 100 (FIG. 3).

Figure 2:
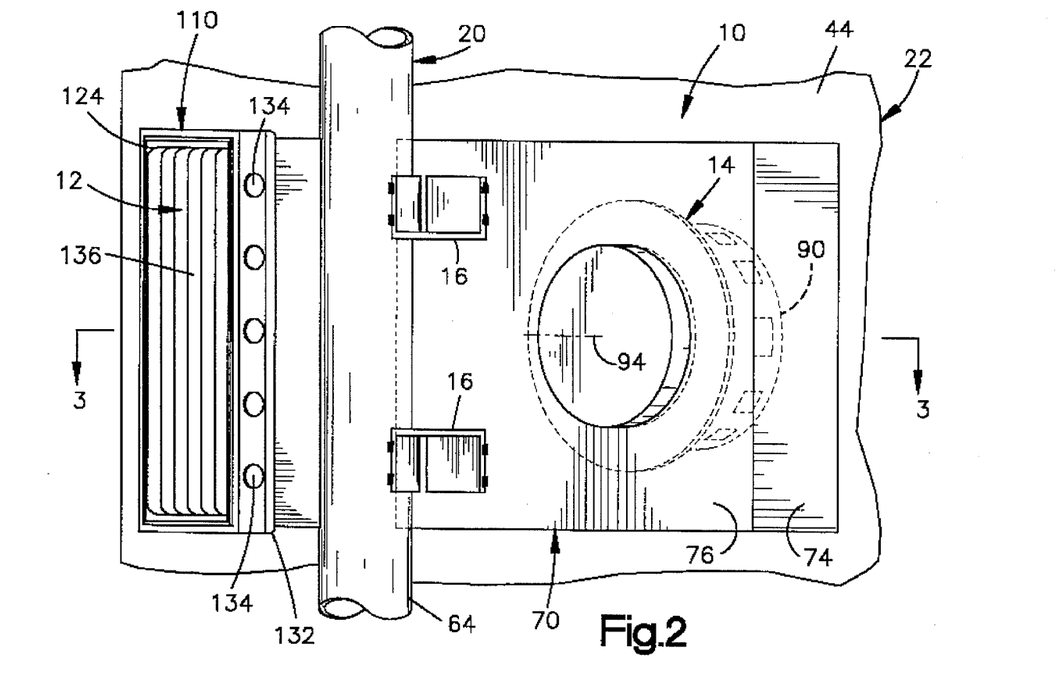
FIG. 2 is an enlarged view of the air bag module of FIG. 1 in an unactuated condition.

The air bag module 200 (FIGS. 5 and 6) includes a chute 260 which is a box-like structure similar to the chute 110 (FIGS. 2–4). The chute 260 is supported in a manner not shown, on the housing 230 or on the seat frame member 226, so that the chute is fixed in position relative to the housing.

The chute 260 includes a plurality of walls which define a chamber 262 in the chute. The walls of the chute 260 define an inlet opening 264 in the chute. The inlet opening 264 is presented generally toward the seat frame member 226, the inflator 250 and the housing 230. The walls of the chute 260 also define an outlet opening 266 in the chute.

The air bag module 200 also includes an air bag 270. The air bag 270 includes a mouth portion 272 (FIG. 6) which is tubular in configuration and which is secured to the chute 260 in a known manner with a retaining ring 274 and fasteners 276. A body portion 278 of the air bag 270 is folded and stored inside the chamber 262 in the chute 260, in a known manner as shown schematically in FIG. 6. The chute 260 supports the folded body portion 278 of the air bag 270 in a position spaced apart from the housing 230 and from the inflator 250. The seat frame member 226 is disposed between the air bag 270 and the inflator 250.

The air bag module 200 further includes a throat 280 which defines an inflation fluid passage 281 for conducting inflation fluid from the housing 230 to the chute 260 to inflate the air bag 270. The throat 280 is connected in fluid communication between the outlet opening 242 in the housing 230 and the inlet opening 264 in the chute 260. The throat 280 is fluid-tight so that it directs inflation fluid from the inflator 250 to flow through the inflation fluid passage 281 into the chute 260 and not into the seat back 224. The throat 280 may be constructed in the same manner as the throat 150 (FIGS. 1–4). The throat 280 may alternatively be constructed in accordance with any one of the embodiments illustrated in FIGS. 9–13.

The throat 280 which is shown schematically in FIGS. 5 and 6 includes a first wall 282 which extends between and interconnects the top wall 232 of the housing 230 and the chute 260. A second wall 284 of the throat 280 extends between and interconnects the top wall 232 of the housing 230 and the chute 260. The second wall 284 of the throat 280 is wrapped partially around the seat frame member 226. The throat 280 also includes front and back walls (not shown) which extend between and interconnect the housing 230 and the chute 260. The second wall 282 of the throat 280, and the top and bottom walls of the throat, are in abutting engagement with the foam material 228 of the seat bottom cushion 222.

The throat 280 is expandable from a first or contracted or collapsed condition shown in solid lines in FIG. 6 to a second or expanded condition shown in dot-dash lines 280a in FIG. 6. When the safety apparatus 200 is in the condition shown in solid lines in FIG. 6, the throat 280 is narrowest at a location adjacent to the seat frame member 226, and the cross-sectional flow area of the throat is smallest at that location. The effective cross-sectional flow area of the throat 280 at that location is substantially less than the effective cross-sectional flow area of the throat at the outlet 242 of the housing 230. Also, the effective cross-sectional flow area of the throat 280 at that location is substantially less than the effective cross-sectional flow area of the throat at the inlet 264 of the chute 260.

At least some of the walls of the throat 280 are movable under the influence of inflation fluid from the inflator 250. Specifically, the first wall 282 of the throat 280, and the front and back walls (not shown) of the throat, are movable between the condition shown in solid lines in FIG. 6 and the condition shown in dot-dash lines in FIG. 6. The first wall 282 and the top and bottom walls of the throat 280 are movable relative to the second wall 284 of the throat and relative to the seat frame member 226. The first wall 282 is movable away from the seat frame member 226. The foam material 228 and the fabric material covering 229 which overlie the wall 282 are movable away from the seat frame member 226 when the wall 282 moves.

The movable walls of the throat 280, including the first wall 282, can be held in a contracted or collapsed condition as shown in solid lines in FIG. 6. When the movable walls of the throat 280, including the first wall 282, are in the condition shown in solid lines in FIG. 6, the inflation fluid passage 281 defined by the throat has a first or contracted effective cross-sectional flow area. The presence of the seat frame member 226 between the inflator 250 and the air bag 270 contributes to the relatively small effective cross-sectional flow area of the throat 280 when the throat is in the condition shown in solid lines in FIG. 6.

In the event of a side impact to the vehicle 212 of a magnitude sufficient to require deployment of the air bag 270, the vehicle electric circuitry actuates the inflator 250 in a known manner. The inflator 250 rapidly discharges a large quantity of inflation fluid at high pressure through the fluid outlet openings 254 into the chamber 240 in the housing 230. The pressure in the housing 230 increases as a result of the actuation of the inflator 250, and the increased fluid pressure is transmitted through the outlet opening 242 in the housing into the inflation fluid passage 281 in the throat 280.

When the fluid pressure in the throat 280 is greater than the forces holding the movable walls of the throat in the collapsed position shown in solid lines in FIG. 6, that is, when the pressure in the throat reaches a first predetermined pressure, the force of the inflation fluid acting on the movable walls, including the first wall 282, of the throat 280 causes the throat to move to the second or expanded position shown in dot-dash lines in FIG. 6. The walls of the throat 280, including the walls 282 and 284, assume the position shown in dot-dash lines in FIG. 6. The first wall 282 and the top and bottom walls of the throat 280 move relative to the second wall 284 of the throat and relative to the seat frame member 226. The first wall 282 moves away from the second wall 284 and away from the seat frame member 226. The foam material 228 and the fabric material covering 229 which overlie the first wall 282 are moved away from the seat frame member 226. The initial opening in the throat 200 may vary in relation to the resistance of the throat material and/or the available inflator energy.

When the throat 280 moves from the condition shown in solid lines in FIG. 6 to the condition shown in dot-dash lines 280a in FIG. 6, the effective cross-sectional flow area of the throat 280 increases to a relatively large second effective cross-sectional flow area which is greater than the first effective cross-sectional flow area. The effective cross-sectional flow area of the throat 280 increases by at least about 20% and, preferably, by about 50% to about 100% or more. The inflation fluid from the inflator 250 flows from the housing 230 through the inflation fluid passage 281 in the throat 280 and into the chute 260. The inflation fluid contacts the folded body portion 278 of the air bag 270 and causes the air bag to inflate.

The air bag 270 inflates from a folded, stored condition to an inflated condition as illustrated in dot-dash lines in FIGS. 5 and 6. The inflating air bag 270 moves a hinged portion 290 (FIG. 6) of the seat bottom cushion 222 in a direction away from the chute 260, to enable deployment of the air bag. When the air bag 270 is in the inflated condition, as shown in dot-dash lines in FIG. 5, the air bag extends between the seat 218 and the door 216 to help protect an occupant of the seat from a forceful impact with the door.

Figure 7:
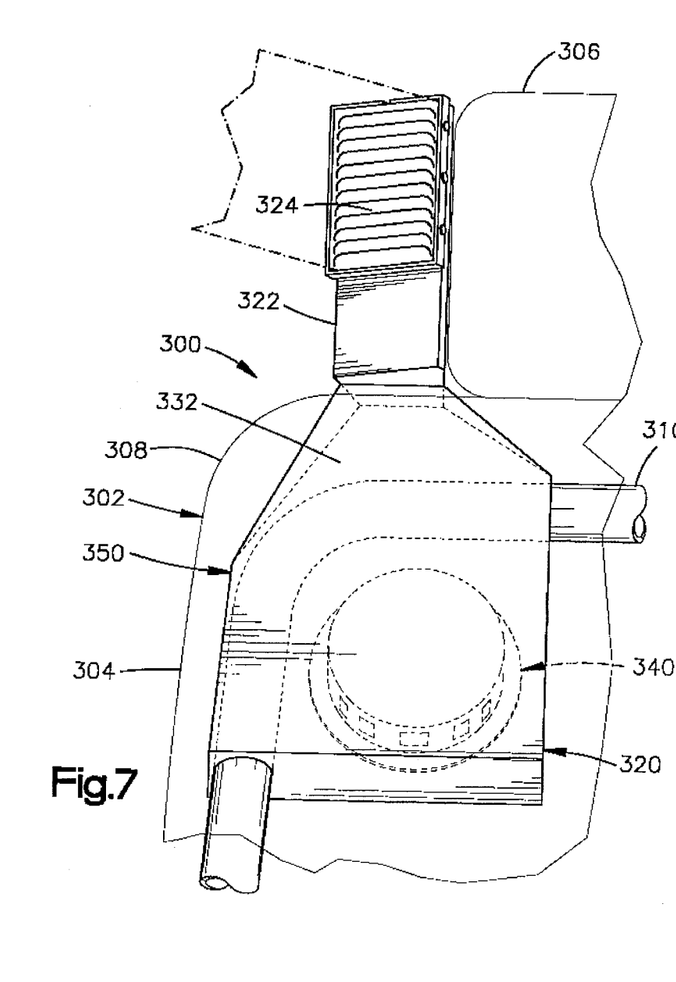
FIG. 7 is a front view of a portion of a vehicle seat including a side impact air bag module in accordance with a third embodiment of the present invention.
Figure 8:
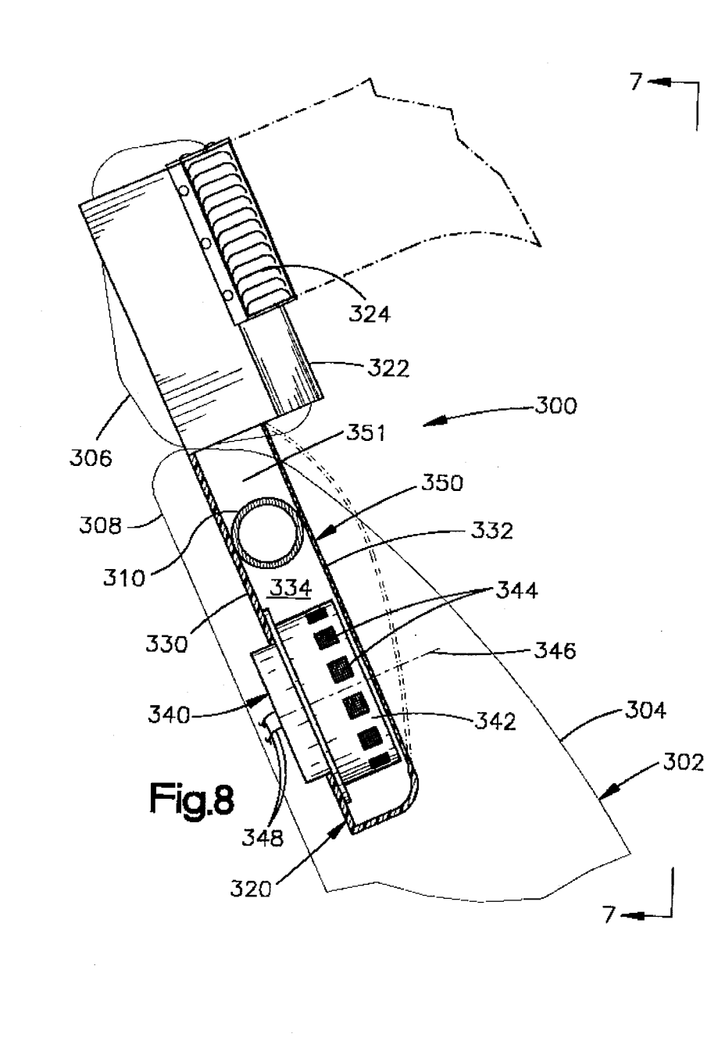
FIG. 8 is a side view partially in section of the air bag module of FIG. 7, shown in solid lines in an unactuated condition and in dot-dash lines in an actuated condition.

FIGS. 7 and 8 illustrate a vehicle safety apparatus, i.e., air bag module 300, which is constructed in accordance with a third embodiment of the present invention. The air bag module 300 is disposed in a vehicle seat 302 which is illustrated as a front passenger seat for an occupant of a vehicle. The seat 302 includes a seat back 304. The seat back 304 includes a headrest 306, which is supported on or which may be formed as one piece with an upper portion 308 of the seat back. A seat frame member 310 is disposed in the seat back 304.

The air bag module 300 is preferably mounted on the seat frame member 310 at a location separate from and next to the headrest 306. The module 300 is preferably enclosed by foam padding material (not shown) and by a piece of fabric material covering (also not shown) similar to that which covers the headrest 306. The air bag module 300 includes a housing 320. The housing 320 is made from sheet metal and has an upper portion or chute 322 for storing an air bag 324 in a folded condition. The housing 320 as illustrated schematically in FIGS. 7 and 8 includes a relatively rigid main wall 330 and a flexible wall 332 which define, in the housing, a chamber 334. The flexible wall 332 is preferably made from a thinner and more flexible material than the main wall 330. The seat frame member 310 extends through the chamber 334 in the housing 320.

An inflator 340 (FIG. 8) is mounted in the housing 320. The inflator 340 may be the same as the inflator 14 (FIGS. 1–4) and comprises a source of inflation fluid for inflating the air bag 324. The inflator 340 has a cylindrical main body portion 342. A plurality of fluid outlet openings 344 are equally spaced in a circular array around a central axis 346 of the inflator 340. The fluid outlet openings 344 enable inflation fluid to flow from the inflator 340 into the chamber 334 in the housing 320. A pair of lead wires 348 extend from the inflator 340 and are connected with known electric circuitry of the vehicle such as the circuitry 100 (FIG. 3), for actuation of the inflator in a known manner in the event of a side impact to the vehicle of a magnitude sufficient to require deployment of the air bag 324.

The air bag module 300 includes a throat 350 which defines an inflation fluid passage 351 for conducting inflation fluid from the inflator 340 to the air bag 326. The seat frame member 310 is disposed in the throat 350 between the air bag 324 and the inflator 340. The throat 350 includes portions of the flexible wall 332 and of the main wall 330. The throat 350 is expandable from a contracted or collapsed condition shown in solid lines in FIG. 8 to an expanded condition shown in dot-dash lines in FIG. 8. The throat 350 is connected in fluid communication between the housing 320 and the chute 322. The throat 350 is fluid-tight so that it directs inflation fluid from the inflator 340 to flow through the inflation fluid passage 351 into the chute 322 and not into the seat back 304. When the throat 350 is in the contracted condition, the seat frame member 310 lies against both the flexible wall 332 and the main wall 330 and substantially blocks the inflation fluid passage 351. The initial opening in the throat 350 may vary in relation to the resistance of the throat material and/or the available inflator energy.

In the event of a side impact to the vehicle of a magnitude sufficient to require deployment of the air bag 324, the vehicle electric circuitry actuates the inflator 340 in a known manner. The inflator 340 rapidly discharges a large quantity of inflation fluid at high pressure through the fluid outlet openings 344 into the chamber 334 in the housing 320. The pressure in the housing 320 increases as a result of the actuation of the inflator 340, and the increased fluid pressure is transmitted into the inflation fluid passage 351 in the throat 350.

The inflation fluid contacts the main wall 330, the flexible wall 332, and the seat frame member 310. When the pressure in the throat 350 is greater than the forces holding the walls 330 and 332 of the throat in the collapsed position shown in FIG. 8, that is, when the pressure in the throat reaches a first predetermined pressure, the force of the inflation fluid acting on the flexible wall 332 of the throat causes the flexible wall to stretch or elongate and to move away from the seat frame member 310 to the expanded position shown in FIG. 8. The effective cross-sectional flow area of the throat 350 increases from the first cross-sectional flow area shown in solid lines FIG. 8 to a second cross-sectional flow area shown in dot-dash lines in FIG. 8. The cross-sectional flow area of the throat 350 increases by at least about 20% and, preferably, by about 50% to about 100% or more. The inflation fluid thereafter flows from the housing 320 through the inflation fluid passage 351 in the throat 350 and into the chute 322. The inflation fluid contacts the folded air bag 324 and causes the air bag to inflate. The air bag 324 moves from the folded and stored condition illustrated in solid lines in FIGS. 7 and 8 to the unfolded and inflated condition illustrated in dot-dash lines in FIGS. 7 and 8 to help protect the vehicle occupant.

FIGS. 9–13 illustrate schematically several alternative designs for expanding throats for air bag modules constructed in accordance with the present invention. Each one of the throats illustrated in FIGS. 9–13 is shown in cross-section and is intended to be connected between a housing of an inflator and a chute which stores a folded air bag. Each one of the throats illustrated in FIGS. 9–13 is expandable, upon actuation of its associated inflator, to increase the cross-sectional flow area of the throat by at least about 20% and, preferably, by about 50% to about 100% or more. An expandable throat constructed in accordance with the present invention can be expandable due to bending of the material of which the throat is made, a mechanical hinge, or a variation in material thickness.

Figures 9, 10:
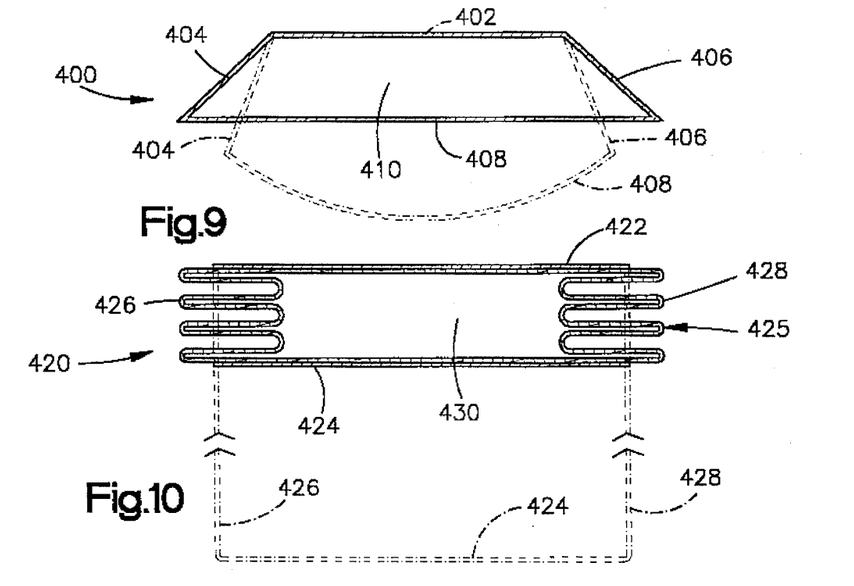
FIG. 9 is a schematic view of a part of an air bag module in accordance with a fourth embodiment of the present invention.
FIG. 10 is a schematic view of a part of an air bag module in accordance with a fifth embodiment of the present invention.

FIG. 9 illustrates schematically a throat 400 which includes a plurality of walls 402, 404, 406 and 408 which are connected for relative movement. The first wall 402 is made from a rigid sheet of metal or plastic. The second wall 404 also is made from a rigid sheet of metal or plastic. The second wall 404 is hingedly connected to the first wall 402. Hinges can be formed by reductions in material thickness at each wall intersection.

The third wall 406 also is made from a rigid sheet of metal or plastic. The third wall 406 is hingedly connected to the first wall 402 at the opposite side of the first wall from the second wall 404.

A flexible fourth wall 408 interconnects the second wall 404 and the third wall 406. The fourth wall 408 can be made from a fabric material or from plastic or metal. The fourth wall 408 is spaced apart from, but adjacent to the first wall 402.

The four walls 402–408 of the throat 400 define between them an inflation fluid passage 410 having a first cross-sectional flow area when the throat 400 is in the condition shown in solid lines in FIG. 9. The throat 400 is connected in fluid communication between a housing of an inflator and a chute which holds an air bag (all not shown). Upon actuation of the inflator, inflation fluid flows into the inflation fluid passage 410 in the throat 400. The force of the inflation fluid moves the walls 402–408 of the throat 400 from the condition shown in solid lines in FIG. 9 to the condition shown in dot-dash lines in FIG. 9. Specifically, the fourth wall 408 bends or flexes to bow outwardly, and the second and third walls 404 and 406 pivot toward each other relative to the first wall 402. The cross-sectional flow area of the inflation fluid passage 410 defined between the four walls 402–408 increases from the first cross-sectional flow area to a second cross-sectional flow area which is greater than the first. Inflation fluid flows from the inflator through the inflation fluid passage 410 in the throat 400 to the air bag to inflate the air bag.

FIG. 10 illustrates schematically a throat 420 which includes first and second walls 422 and 424 which are connected for relative movement. The first wall 422 is made from a single piece of rigid material such as metal or plastic. The second wall 424 also is made from a single piece of rigid material such as metal or plastic.

A flexible wall section 425 interconnects the first wall 422 with the second wall 424. The flexible wall section 425 has a bellows-type configuration and could be made from fabric material or plastic. The flexible wall section 425 includes spaced-apart first and second portions 426 and 428 extending between the first wall 422 and the second wall 424. The second wall 424 of the throat 420 is thus connected with the first wall 422 for movement relative to the first wall.

The first wall 422 is normally spaced apart from, but adjacent to the second wall 424. The flexible wall section 425 is normally in the folded condition shown in solid lines in FIG. 10. The first and second walls 422 and 424 and the flexible wall section 425 define between them an inflation fluid passage 430 having a first cross-sectional flow area.

The throat 420 is connected in fluid communication between a housing of an inflator and a chute which holds an air bag (not shown). Upon actuation of the inflator, inflation fluid from the inflator flows into the inflation fluid passage 430 in the throat 420. The force of the inflation fluid elongates and unfolds the first and second portions 426 and 428 of the flexible wall section 425. The first and second walls 422 and 424 move from the relative position shown in solid lines in FIG. 10 to the relative position shown in dot-dash lines in FIG. 10. The cross-sectional flow area of the inflation fluid passage 430, between the first wall 422 and the second wall 424, increases from the first cross-sectional flow area to a second cross-sectional flow area which is greater than the first. Inflation fluid flows from the inflator through the inflation fluid passage 430 in the throat 420 to the air bag to inflate the air bag.

Figure 11:
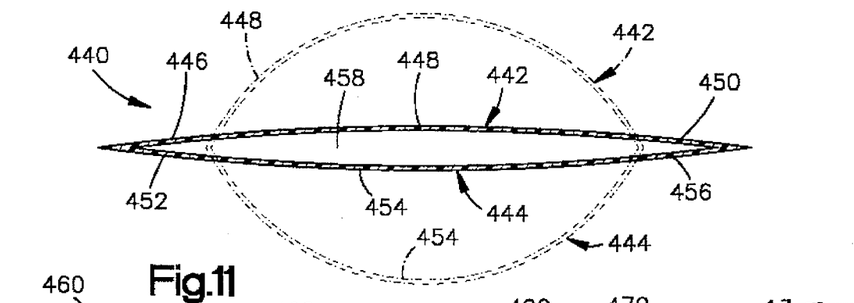
FIG. 11 is a schematic view of a part of an air bag module in accordance with a sixth embodiment of the present invention.

FIG. 11 illustrates schematically a throat 440 which includes opposite first and second flexible walls 442 and 444. The first and second walls 442 and 444 can be made as one piece from sheet metal, fabric or plastic, or alternatively can be formed as separate pieces joined together. The first wall 442 has a first side section 446, a central section 448, and a second side section 450. The second wall 444 has a first side section 452, a central section 454, and a second side section 456.

The first side section 446 of the first wall 442 is connected with the first side section 452 of the second wall 444. The second side section 450 of the first wall 442 is connected with the second side section 456 of the second wall 444. The central section 448 of the first wall 442 is normally spaced apart from the central section 454 of the second wall 444 by a relatively small distance, when the throat 440 is in a first condition as shown in solid lines in FIG. 11. The first and second walls 442 and 444 define between them an inflation fluid passage 458 having a first cross-sectional flow area, when the throat 440 is in the first condition.

The throat 440 is connected in fluid communication between a housing of an inflator and a chute which holds an air bag (not shown). Upon actuation of the inflator, inflation fluid from the inflator flows into the inflation fluid passage 458 in the throat 440. The first and second walls 442 and 444 of the throat 440 bend or flex. The force of the inflation fluid moves the first and second walls 442 and 444 of the throat 440 from the condition shown in solid lines in FIG. 11 to the dome-shaped condition shown in dot-dash lines in FIG. 11. The cross-sectional flow area of the inflation fluid passage 458 defined between the first wall 442 and the second wall 444 increases from the first cross-sectional flow area to a second cross-sectional flow area which is greater than the first cross-sectional flow area. Inflation fluid flows from the inflator through the inflation fluid passage 458 in the throat 440 to the air bag to inflate the air bag.

Figure 12:
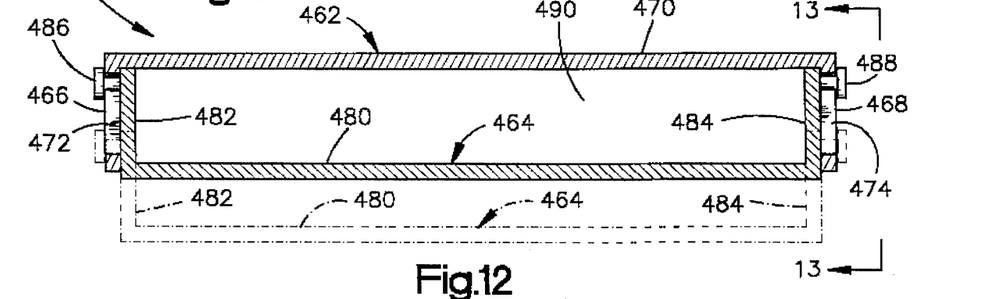
FIG. 12 is a schematic view of a part of an air bag module in accordance with a seventh embodiment of the present invention.
Figure 13:
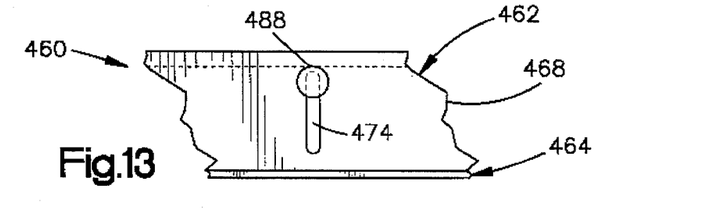
FIG. 13 is a side view of the part illustrated in FIG. 12.

FIGS. 12 and 13 illustrate schematically a throat 460 which includes first and second walls 462 and 464 which are connected for relative sliding movement. The first wall 462 is made from a single piece of metal and has a rigid U-shaped configuration which is provided by opposite first and second side sections 466 and 468 and a central section 470. The first side section 466 includes a first slot 472 and the second side section 468 includes a second slot 474.

The second wall 464 is similar in configuration to the first wall 462 and is fitted inside the first wall for sliding movement relative to the first wall. The second wall 464 of the throat 460 is made from a single piece of metal having a rigid U-shaped configuration which is provided by a central section 480 and first and second opposite side sections 482 and 484. The first side section 482 of the second wall 464 includes a first locator pin 486 which extends through the first slot 472 in the first side section 466 of the first wall 462. The second side section 484 of the second wall 464 includes a second locator pin 488 which extends through the second slot 474 in the second side section 468 of the first wall 462.

The second wall 464 is thus connected with the first wall 462 for sliding movement relative to the first wall 462. The central section 470 of the first wall 462 is spaced apart from, but adjacent to the central section 480 of the second wall 464. The first and second walls 462 and 464 define between them an inflation fluid passage 490 having a first cross-sectional flow area when the walls are in the condition shown in solid lines in FIG. 12.

The throat 460 is connected in fluid communication between a housing of an inflator and a chute which holds an air bag (not shown). Upon actuation of the inflator, inflation fluid from the inflator flows into the inflation fluid passage 490 in the throat 460. The force of the inflation fluid in the inflation fluid passage 490 moves the first and second walls 462 and 464 from the condition shown in solid lines in FIG. 12 to the condition shown in dot-dash lines in FIG. 12. The first locator pin 486 on the second wall 464 slides along the first slot 472 in the first wall 462. The second locator pin 488 on the second wall 464 slides along the second slot 474 in the first wall 462. The cross-sectional flow area between the first wall 462 and the second wall 464 increases from the first cross-sectional flow area to a second cross-sectional flow area which is greater than the first. Inflation fluid flows through the inflation fluid passage 490 in the throat 460 from the inflator to the air bag to inflate the air bag.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus comprising:

a seat in which the vehicle occupant sits;

an inflatable vehicle occupant restraint mounted in said seat, said inflatable restraint having a deflated condition stored in said seat and having an inflated, occupant protecting condition extending out of said seat;

an inflator mounted in said seat at a location spaced apart from said inflatable restraint, said inflator being actuatable to direct inflation fluid under pressure into said inflatable restraint to inflate said inflatable restraint; and wall means for defining in said seat an inflation fluid passage extending between said inflator and said inflatable restraint for directing inflation fluid from said inflator to said inflatable restraint upon actuation of said inflator;

said wall means having a first condition when said inflator is not actuated in which said inflation fluid passage has a first effective cross-sectional flow area;

said wall means being expandable, upon actuation of said inflator, from the first condition to a second condition in which said inflation fluid passage has a second effective cross-sectional flow area which is greater than said first effective cross-sectional flow area, said seat including a seat frame member extending through said inflation fluid passage.

2. A vehicle occupant safety apparatus comprising:

a seat in which the vehicle occupant sits;

an inflatable vehicle occupant restraint mounted in said seat, said inflatable restraint having a deflated condition stored in said seat and having an inflated, occupant protecting condition extending out of said seat;

an inflator mounted in said seat at a location spaced apart from said inflatable restraint, said inflator being actuatable to direct inflation fluid under pressure into said inflatable restraint to inflate said inflatable restraint; and wall means for defining in said seat an inflation fluid passage extending between said inflator and said inflatable restraint for directing inflation fluid from said inflator to said inflatable restraint upon actuation of said inflator;

said wall means having a first condition when said inflator is not actuated in which said inflation fluid passage has a first effective cross-sectional flow area;

said wall means being expandable, upon actuation of said inflator, from the first condition to a second condition in which said inflation fluid passage has a second effective cross-sectional flow area which is greater than said first effective cross-sectional flow area, said wall means comprising a first wall, a second wall, and means for connecting said second wall with said first wall for sliding movement relative to said first wall to increase the effective cross-sectional flow area of said inflation fluid passage upon actuation of said inflator.

3. A vehicle occupant safety apparatus comprising:

a seat in which the vehicle occupant sits;

an inflatable vehicle occupant restraint mounted in said seat, said inflatable restraint having a deflated condition stored in said seat and having an inflated, occupant protecting condition extending out of said seat;

an inflator mounted in said seat at a location spaced apart from said inflatable restraint, said inflator being actuatable to direct inflation fluid under pressure into said inflatable restraint to inflate said inflatable restraint; and wall means for defining in said seat an inflation fluid passage extending between said inflator and said inflatable restraint for directing inflation fluid from said inflator to said inflatable restraint upon actuation of said inflator;

said wall means having a first condition when said inflator is not actuated in which said inflation fluid passage has a first effective cross-sectional flow area;

said wall means being expandable, upon actuation of said inflator, from the first condition to a second condition in which said inflation fluid passage has a second effective cross-sectional flow area which is greater than said first effective cross-sectional flow area, said wall means including a flexible first wall having opposite first and second side portions and a central portion and a flexible second wall having opposite first and second side portions and a central portion, said first side portion of said first wall being connected with said first side portion of said second wall, said second side portion of said first wall being connected with said second side portion of said second wall, said central portion of said first wall being disposed adjacent to said central portion of said second wall, said central portion of said first wall being spaced apart from said central portion of said second wall by a first distance prior to actuation of said inflator, said central portion of said first wall moving away from said central portion of said second wall upon actuation of said inflator to enlarge the effective cross-sectional flow area of said inflation fluid passage.

4. A vehicle occupant safety apparatus comprising:

a seat in which the vehicle occupant sits;

a folded inflatable vehicle occupant restraint mounted in said seat, said inflatable restraint having a deflated condition stored in said seat and having an inflated, occupant protecting condition extending out of said seat between the occupant and the side of the vehicle;

an inflator mounted in said seat at a location spaced laterally apart from said inflatable restraint, said inflator being actuatable in response to an impact of a predetermined magnitude to the side of the vehicle to direct inflation fluid under pressure into said inflatable restraint to inflate said inflatable restraint; and wall means for defining in said seat an inflation fluid passage extending between said inflator and said inflatable restraint for directing inflation fluid from said inflator to said inflatable restraint upon actuation of said inflator;

said wall means having a first condition when said inflator is not actuated in which said inflation fluid passage has a first effective cross-sectional flow area;

said wall means being movable due to the force of the inflation fluid acting on said wall means, upon actuation of said inflator, from the first condition to a second condition in which said inflation fluid passage has a second effective cross-sectional flow area which is greater than said first effective cross-sectional flow area.

5. An apparatus as set forth in claim 4 comprising a rigid housing in which said inflator is mounted, a rigid chute which is spaced laterally apart from said housing and in which said inflatable restraint is stored in the deflated condition, and wherein said wall means comprises an expandable throat interconnecting said housing and said chute, said throat defining said inflation fluid passage.

6. An apparatus as set forth in claim 5 wherein said housing has an inflation opening lying in a first horizontal plane and said chute has a chute opening lying in a second horizontal plane, said chute opening and said inflation opening being interconnected by said expandable throat, said first and second planes intersecting each other.

7. An apparatus as set forth in claim 4 further comprising a seat frame member disposed within said seat between said inflatable vehicle occupant restraint and said inflator, said wall means being partially wrapped around and abutting said frame member.

8. An apparatus as set forth in claim 4 wherein said seat includes a body of foam padding material overlying said wall means, said foam padding material being movable upon actuation of said inflator in response to movement of said wall means from the first condition to the second condition.

9. An apparatus as set forth in claim 4 wherein said seat includes a seat frame member disposed adjacent to said wall means, said inflation fluid passage being defined between said seat frame member and said foam padding material, said foam padding material moving away from said seat frame member upon actuation of said inflator.

10. An apparatus as set forth in claim 4 wherein said wall means is made of corrugated metal.

11. An apparatus as set forth in claim 4 wherein said wall means is made of plastic.

12. An apparatus as set forth in claim 4 wherein said wall means is made of woven fabric.

13. An apparatus as set forth in claim 4 wherein said wall means comprises a plurality of wall members.

14. An apparatus as set forth in claim 13 wherein said plurality of wall members comprise three rigid wall members and one flexible wall member, said flexible wall member being movable relative to at least one of said rigid wall members upon actuation of said inflator to increase the effective cross-sectional flow area of said inflation fluid passage.

15. An apparatus as set forth in claim 13 wherein said plurality of wall members comprise two rigid wall members and at least one flexible wall member, said flexible wall member being movable relative to at least one of said rigid wall members upon actuation of said inflator to increase the effective cross-sectional flow area of said inflation fluid passage.

16. An apparatus as set forth in claim 15 wherein said flexible wall member comprises a bellows portion which elongates from a folded condition to an unfolded condition upon actuation of said inflator to enlarge the effective cross-sectional flow area of said inflation fluid passage.

17. An apparatus as set forth in claim 4 wherein said wall means defines an unobstructed opening of said first effective cross-sectional flow area prior to actuation of said inflator.

* * * * *